United States Patent [19]

Yellowley

[11] Patent Number: 5,176,501

[45] Date of Patent: Jan. 5, 1993

[54] PROPELLER WITH AN ELASTIC SLEEVE

[75] Inventor: Ian Yellowley, West Vancouver, Canada

[73] Assignee: The University of British Columbia, Vancouver, Canada

[21] Appl. No.: 628,353

[22] Filed: Dec. 17, 1990

[51] Int. Cl.$^5$ .............................................. B63H 1/26
[52] U.S. Cl. ................................ 416/224; 416/227 R; 416/227 A
[58] Field of Search ............... 416/224, 227 R, 227 A, 416/237, 223, 240 A

[56] References Cited

U.S. PATENT DOCUMENTS

| | | | |
|---|---|---|---|
| 6,914 | 11/1849 | Patch | 416/227 A |
| 1,740,596 | 12/1929 | Hohlt | 416/227 A |
| 3,549,444 | 12/1970 | Katz | 416/224 |
| 3,918,839 | 11/1975 | Blackwell et al. | 416/240 A |
| 3,928,901 | 12/1975 | Schilling et al. | 416/224 |
| 4,624,624 | 11/1986 | Yum | 416/427 A |

FOREIGN PATENT DOCUMENTS

| | | | |
|---|---|---|---|
| 0103263 | 5/1926 | Austria | 416/227 A |
| 0554793 | 3/1958 | Canada | 416/224 |
| 0073495 | 6/1977 | Japan | 416/224 |
| 0207882 | 9/1986 | Japan | 416/224 |
| 8201990 | 12/1983 | Netherlands | 416/227 A |
| 0541078 | 11/1941 | United Kingdom | 416/224 |
| 0831380 | 3/1970 | United Kingdom | 416/224 |

OTHER PUBLICATIONS

Design Engineering May 1984 p. 9.
Conference: Mankind's Future Source of Energy New Delhi, India Jan. 1978.

Primary Examiner—Thomas E. Denion
Attorney, Agent, or Firm—C. A. Rowley

[57] ABSTRACT

A propeller system is formed on a shaft by at least one pair of axially spaced propeller blades each having a first and a second blade section extending at a selected acute (or obtuse) angle to the axis of the shaft, the first sections and second sections respectively of the pair of propeller blades are substantially parallel to each other and the tips of the first sections of each of the blades are connected to the tips of the second section of each of the blades respectively to form a box shape. The shaft is connected to the propeller system in a manner so that the axis of the shaft extends substantially diagonally of the box shape whereby the parallel sections of the blades move in opposite directions relative to the fluid in which they are contained when the shaft is rotated to facilitate improvement of the efficiency of the propeller system. The shaft preferably is mounted oriented to the direction of relative fluid flow between the propeller blades and the fluid so that each blade section extends substantially perpendicular to the direction of relative flow over a significant portion of its rotation and each blade section will be substantially parallel to the direction of fluid flow relative to the propeller blade during a further portion of the rotation of the propeller blades.

4 Claims, 2 Drawing Sheets

PROPELLER WITH AN ELASTIC SLEEVE

FIELD OF THE INVENTION

The present invention relates to a propeller. More particularly the present invention relates to a quadrangular propeller system that may be used either as a driving or driven propeller and is composed of a pair of propeller blades arranged in a rectangular configuration to permit increased efficiency.

BACKGROUND OF THE PRESENT INVENTION

Many different propeller systems are used both for extracting energy from flowing fluid stream, or for example for driving a boat or airplane or the like through fluid.

Windmills may be classified into three basic classes; the horizontal axis lift type which is simply a propeller oriented with its axis of rotation substantially parallel to the wind direction and normally with its blades extending substantially perpendicular to the axis of rotation. These systems are conventionally used and are similar to propellers used to propel an airplane or as the screw for driving the ship or boat through the water.

It is also known to orient the axis of rotation of the windmill or the like substantially perpendicular to the direction of relative fluid flow. Such devices incorporating a drag type impeller are known as Savonious mills and those having a lift type impeller are known as Darrieus windmills.

Darrieus type windmills are shown in U.S. Pat. No. 1,835,018 issued Dec. 8, 1931 to Darrieus and U.S. Pat. No. 4,112,311 issued Sept. 5, 1978 to Theyse. U.S. Pat. No. 1,100,332 issued Jun. 16, 1914 to Smith appears to be a combination of the Savonious and Darrieus type windmills.

U.S. Pat. No. 4,390,148 issued Jun. 28, 1983 to Cudmore, discloses a rotary wind device wherein the axis of rotation of the rotor is oriented to be substantially parallel to the direction of intended movement but with a slight upward tilt to provide lift.

Some years ago Dr. Gunther Wagner built a prototype wind mill using two blade sections oriented at 90° and mounted on a shaft the axis of which was at an angle of 45° to the blade sections and oriented so that in one position one of the blade sections is horizontal while the other is vertical.

BRIEF DESCRIPTION OF THE PRESENT INVENTION

It is an object of the present invention to provide a rectangular box like propeller system formed by a pair of propeller blades whereby the out flow from one of the blades tends to improve the efficiency of the other blade.

The present invention relates broadly to a rectangular box like propeller system formed by a pair of interconnected propeller blades each formed by a pair of blade sections and mounted on an axal extending diagonally of the rectangular such that blade sections of one of the blades of said pair of blades are parallel to corresponding blade sections on the other blade of said pair of blades so that one blade section of each pair of parallel blade sections moves through a fluid in the opposite direction to the other blade section of said pair of parallel blade sections thereby permitting one blade section to extract energy from the fluid passing through the other blade section parallel thereto and having a component in the direction of movement of said one blade section.

Broadly the present invention relates to a propeller system comprising at least one pair of axially spaced propeller blades mounted on a shaft, each of said propeller blades having a first blade section and a second blade section, each of said propeller blades has each of its blade section extending at an angle to the axis of said shaft and circumferentially spaced relative to each other around said axis, said first section of one of said pair of blades being substantially parallel to said first section of the other of said pair of blades and said second section of said one of said pair of blades being substantially parallel two said second section of said other of said pair of blades, a tip of said first section and of said second section of said one of said blades remote from said axis being connected respectively to a tip of said second section and said first section of said other of said pair of blades to form a box shape, said axis of said axle extending substantially diagonally of said box shape whereby rotation of said axis causes movement of said parallel sections of said one and said other of said pair of blades to move in opposite directions through a fluid.

Preferably means will be provided for orienting said shaft relative to a direction of fluid flow relative to said propeller system so that each of said blade sections is substantially perpendicular to said direction of fluid flow relative to said propeller system during a significant portion of its rotational travel around said axis and of said blade sections substantially parallel to said direction of said flow relative to said propeller system during another portion of their rotation about said axis.

It is preferred that said angle be 45 degrees.

To form a relatively inexpensive propeller system, it is preferred that the propeller system be formed from a single flat strip of material by bending to form connecting portions connecting the first and second blade sections of said first blade to each other and to said shaft and a second connecting portion means connecting said first and second blade sections of said second propeller blade together and to said shaft.

Preferably each of said blade sections will be contained in an elastic sleeve formable by fluid pressure to a substantially foil shape.

When the system is used in incompressible fluid such as water it is preferred that the shaft be mounted relative to the level of the liquid so that each blade section is above the level of the liquid during at least a significant portion of its rotation when it is oriented substantially parallel to said direction of fluid flow relative to said propeller system.

For more efficient operation it is preferred to provide a plurality of said propeller systems mounted on a single shaft with substantially uniform circumferential spacing therebetween.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
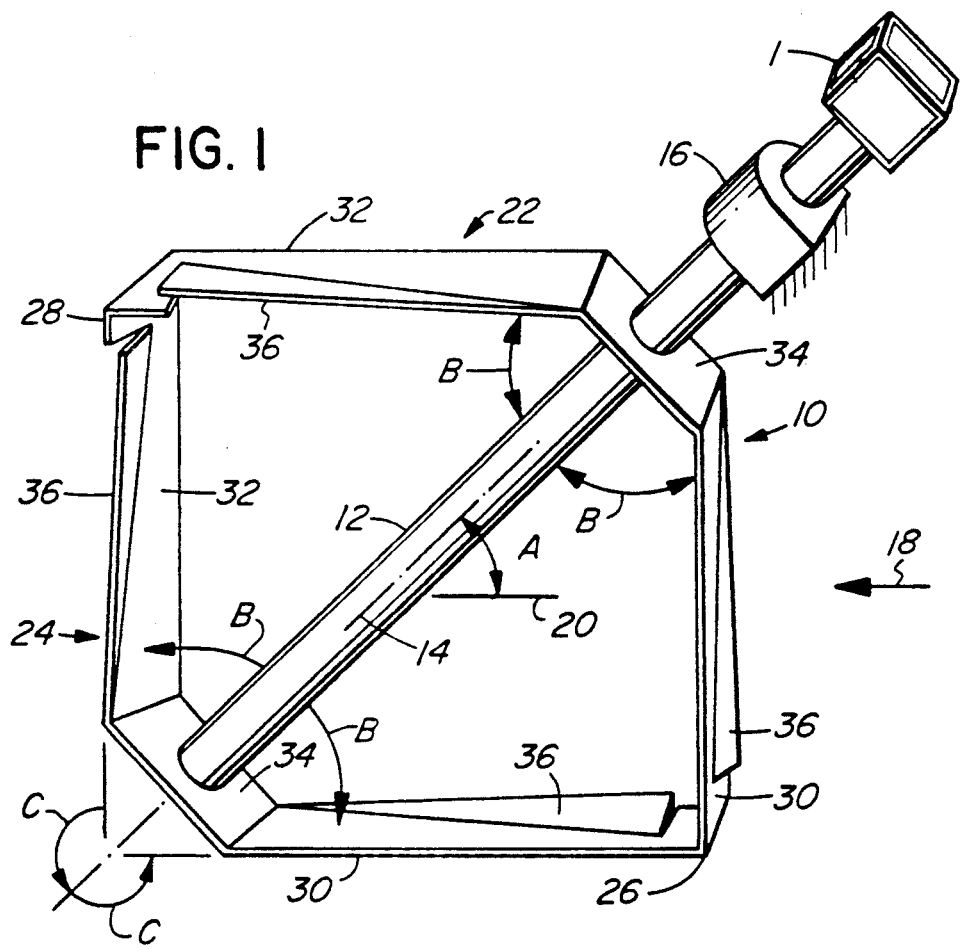
FIG. 1 is a schematic isometric view of one form of propeller system incorporating the present invention.

FIG. 1 illustrates a rectangular box shaped propeller system 10 constructed in accordance with the present invention and composed of two propeller blades 22 and 24 interconnected at their tips to form the rectangular (substantially square) box shape as will be described hereinbelow. The propeller system may be driven by a motor or the like or used to drive, for example, a generator. The motor or generator are schematically illustrated by the element 1 in FIG. 1.

Referring to FIG. 1, the propeller system 10 is mounted on a shaft 12 and rotatable about the axis 14 of the shaft 12. This axis 12 is mounted by a mounting means schematically illustrated at 16 so that the axis 14 of the shaft 12 is at an angle A to the direction of fluid flow relative to the propeller system 10 as indicated by the arrow 18 and projected as line 20.

As above indicated, the propeller system 10 is formed by a first propeller blade 22 and a second propeller blade 24 which are substantially the same (except for orientation) and which have the tips of their respective blade sections interconnected at the corners 26 and 28 respectively to provide a relatively inexpensive propeller system wherein at least two blade sections (one on each blade) are in active or working position at all times. The two active blades move in opposite directions through the fluid which permits improving the efficiency of the propeller system 10.

The blade 22 (and thus the blade 24) is composed of a first propeller section 30 extending at an angle B to the axis 14 of the shaft 12 and a second propeller section 32 extending at a similar angle B to the shaft axis 14 but spaced circumferentially by about 180 degrees from the section 30, i.e. the blade sections 30 and 32 as will be apparent when the propeller system is formed from a bent strip 40 (as will be described below) the blade sections of a propeller blade are not quite in a straight line.

The blade sections 30 and 32 are interconnected adjacent the shaft 12 via a connecting bridge 34 which also connects the propeller blade 22 to the shaft 12.

As above indicated the propeller 24 also has a first blade section 30 extending at angle C to the axis 14 and a second blade section 32 extending at the same angle C to the axis 14 but spaced circumferentially around the axis by about 180 degrees in the same manner as the blade sections of the blade 22. The angle C is supplement to the angle B so that the first blade sections 30 of the first and second propeller blades 22 and 24 are substantially parallel and similarly the second blade sections 32 of the first and second propeller blades 22 and 24 are substantially parallel.

The propeller blade sections 30 and 32 of the second propeller blade 24 are interconnected and connected to the shaft 23 by the bridging section 34 in a similar manner as the blade sections 30 and 32 of the first propeller blade 22 were interconnected and connected to the shaft 12. The tips of the first blade section 30 of the blades 22 and 24 are connected to their respective adjacent tips of the second sections 32 of the blades 22 and 24 to form a rectangular box shaped propeller system 10.

In FIG. 1, each of the propeller blade sections 30 and 32 is formed with a bent portion 36 that is configured to improve the operation of the system by more closely approaching an airfoil yet permitting a simple construction from a strip of material as will be described below.

It will be apparent that the blade sections 30 and 32 of the blade 22 and 24 could also be moulded or otherwise shaped into proper foil configuration for maximum efficiency. However, this would be a more expensive construction but one that may well be justified in some cases.

Figure 2:
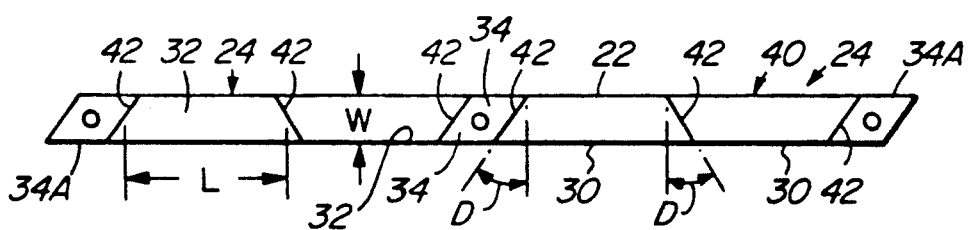
FIG. 2 is a plan view of a strip blank that may be used to form a very simple version of the propeller system of the present invention.

FIG. 2 shows a very simple inexpensive manner of producing the rectangular propeller system 10 shown in FIG. 1 from a single strip 40 by folding along the lines 42 to define the two propeller blades 22 and 24, their blade sections 30 and 32 and their bridging sections 34 and 34A (there are two bridging sections 34A shown these two are combined in the finished rectangular system 10 to form a single bridging member for one of the propeller blades as will be obvious).

The angle D of the fold lines to the length of the strip 40 defines the attack angle of the blade sections 30 and 32 and will be selected accordingly. Obviously the dimension W indicates the width of the blade sections and the dimension L indicates the length of the blade sections of the simple structure to be formed.

In the FIG. 2 arrangement no flaps 36 are provided and thus there is a constant attack angle. It is preferred to use the structure as shown in FIG. 1 wherein flaps 36 are formed in each of blade sections to permit varying the angle of attack in accordance with the radius of rotation about the axis 14 or to provide properly formed foil sections, instead of each blade section having a substantially constant angle of attack along its full length as would result from the blank of FIG. 2.

In the FIG. 2 arrangement the ends of the blade sections 30 of the first and second propeller blades 22 and 24 remote from the bridging sections 34 (or 34A) are interconnected by one of the fold lines 42 and similarly the ends of the blade sections 32 of the first and second blades 22 and 24 are interconnected by another of the folds 42.

Figure 4:
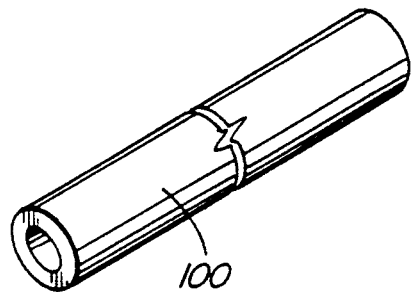
FIG. 4 is a schematic isometric view of a sleeve that may be used to improve the performance of the propeller system.

The efficiency of the propeller shown in FIG. 2 can be improved by sliding a sleeve of stretchably material such as the sleeve 100 shown in FIG. 4 along substantially the full length of the strip 40. Obviously the sleeve 100 will be provided with suitable apertures to receive the shaft 12.

Figure 5:
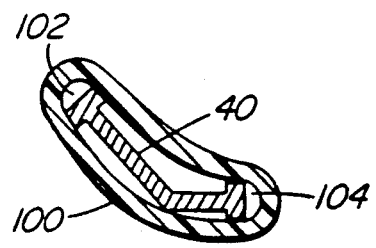
FIG. 5 is a section through one of the propeller sections illustrating the sleeve mounted in position.

Sleeve 100 is stretched radially as it is pulled over the strip 40 and is protected from being damaged by the leading and trailing edges of the blade sections or strip 40 by substantially u-shaped plastic strips 102 and 104 that are slid onto these edges as shown in FIG. 5.

The force of the fluid acting on the sleeve 100 deforms the sleeve much in the manner of a sail thereby conforming the sleeve into a better foil shape.

Figure 3:
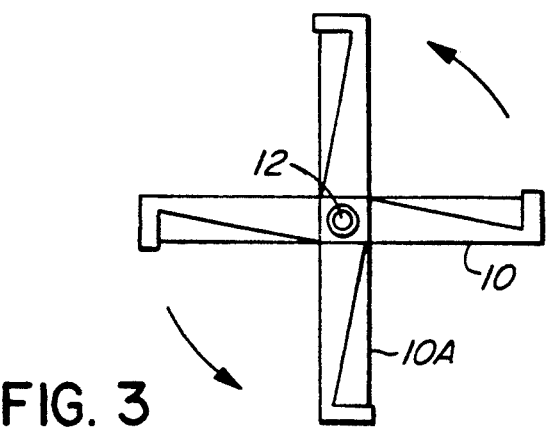
FIG. 3 is an axial view of the propeller of FIG. 1 but showing a second propeller system mounted circumferentially spaced 90 degrees to the first system.

To further improve the efficiency of the system it is preferred to use a plurality of propeller systems 10 on the same shaft 12. Such an arrangement is shown in FIG. 3 wherein a pair of propeller systems substantially as shown in FIG. 1 are mounted on the same shaft 12 spaced circumferentially around the shaft at 90 degree intervals, i.e. the quadrangular propellers 10 an 10A are spaced circumferentially 90 degrees. If more propeller systems 10 were to be incorporated on the same shaft 12 they would be uniformly spaced circumferentially about the axis 14 of the shaft 12.

Figure 6:
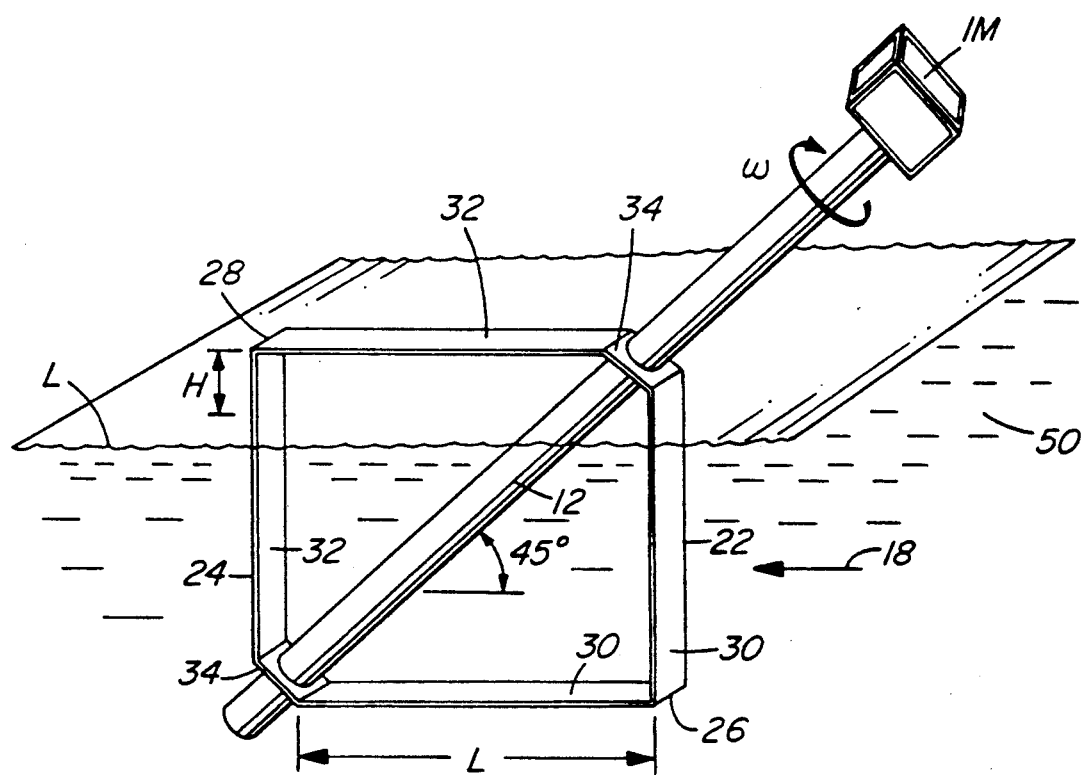
FIG. 6 is a schematic illustration of the positioning of a propeller system of the present invention for use in an incompressible fluid such as water.

Referring to FIG. 6, the preferred arrangement has been illustrated wherein the shaft 12 extends at an angle of substantially 45 degrees to the direction of fluid flow as indicated by arrow 18, i.e. angle A equals 45 degrees. In this arrangement the angle B will also be 45 degrees and the angle C will be the supplement of the 45 degrees of 135 degrees.

The top blade section 32 of FIG. 4 is in a position above the level L of the liquid 50 by a distance H. This distance H for best operation will vary depending on the blade length L of the blade sections 30 and 32 and generally should be about 1/10 the length, i.e. $H = L/10$ and generally will be in the range of $H = /L5$ to $L/15$.

Obviously the distance H defines time the uppermost blade 30 ore 32 is free from the liquid and since each blade section 30 and 32 in its uppermost positions will be substantially parallel to the direction of the relative movement 18 and will not be providing a driving force but will simply apply a drag to the system, it is preferred that each blade section 30 and 32 in it uppermost position be above the level of the liquid as it then develops significantly less drag. Only the lower blade section, in the illustrated position, the lower blade section 30 of the second blade 24, will contribute significantly to the drag force without at the same time providing a lift force in the direction of motion. This lower blade section 30 when the shaft 12 is driven by a prime mover as indicated schematically at 1 (not by the fluid), will tend to apply torque perpendicular to the axis 12 tending to hold the bow, assuming the propeller system is applied to a boat, down.

If the distance H is too great, the effective length of the operative blade sections 30 and 32, of the first and second blades 22 and 24 respectively will be reduced.

The length L is also important if the efficiency of the system is to be improved significantly by using energy in the fluid passing from the "leading" blade section 200 in FIG. 6 to the "trailing" parallel blade section 202 i.e. if the distance between the blade sections 200 and 202 is too great there will be little momentum in the fluid approaching the blade section 202 in the direction of movement of the blade section 202.

As above indicated the propeller system 10 may be used either to drive the rotary element such as a generator by relative movement of the fluid past the propeller system or to be driven by a prime mover to propel a boat or the like.

Having described the invention, modifications will be evident to those skilled in the art without departing from the spirit of the invention as defined in the appended claims.

I claim:

1. A propeller system comprising at least one pair of axially spaced propeller blades mounted on a shaft, each of said propeller blades having a first blade section and a second blade section, each of said propeller blades having each of its blade sections extending at an angle to the axis of said shaft and circumferentially spaced relative to each other around said axis, said first blade section of one of said pair of blades being substantially parallel to said first section of the other of said pair of blades and said second blade section of said one of said pair of blades being substantially parallel to said second blade section of said other of said pair of blades, a tip of said first section and of said second section of said one of said blades remote from said axis being connected respectively to an adjacent tip of said second blade section and said first blade section of said other of said pair of blades to form a box shape, said axis of said axle extending substantially diagonally of said box shape whereby rotation of said axis causes movement of said parallel blade sections of said one and said other of said pair of blades to move in opposite directions through a fluid, elastic sleeve means formable by fluid pressure to substantially foil shape, said elastic sleeve means containing each of said blade sections, said elastic sleeve means being supported by its respective said blade section adjacent the edges of said blade section with an intermediate portion of said sleeve at least on one side of said blade being unsupported between its points of support at said edges of said blade sections.

2. A propeller system as defined in claim 1 wherein said angle is 45 degrees.

3. A propeller system as defined in claim 1 wherein said propeller system is formed from a single flat strip of material by bending to provide a first connecting means connecting said first and second blade sections of said one of said blade to each other and to said shaft and a second connecting means connecting said first and second blade sections of the other of said propeller blades together and to said shaft.

4. A propeller system as defined in claim 1 further comprising a plurality of said pairs propeller blades are uniformly circumferentially spaced about said shaft.

* * * * *